May 13, 1952 B. C. HAMILTON 2,596,549
MULTIPLE BUSHING REPLACER
Filed Jan. 21, 1950 3 Sheets-Sheet 1
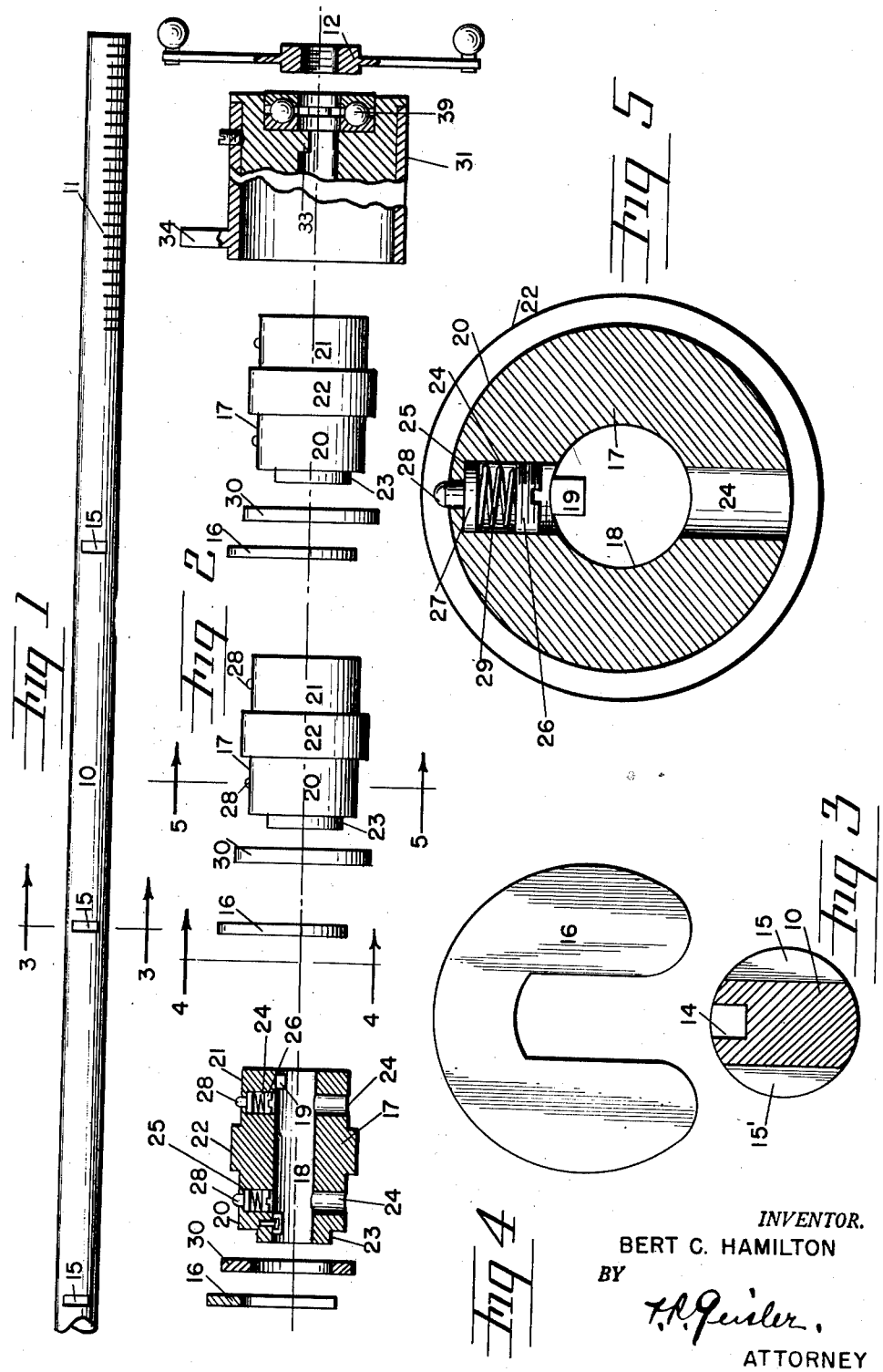
INVENTOR.
BERT C. HAMILTON
BY
ATTORNEY May 13, 1952  B. C. HAMILTON  2,596,549
MULTIPLE BUSHING REPLACER
Filed Jan. 21, 1950  3 Sheets-Sheet 2
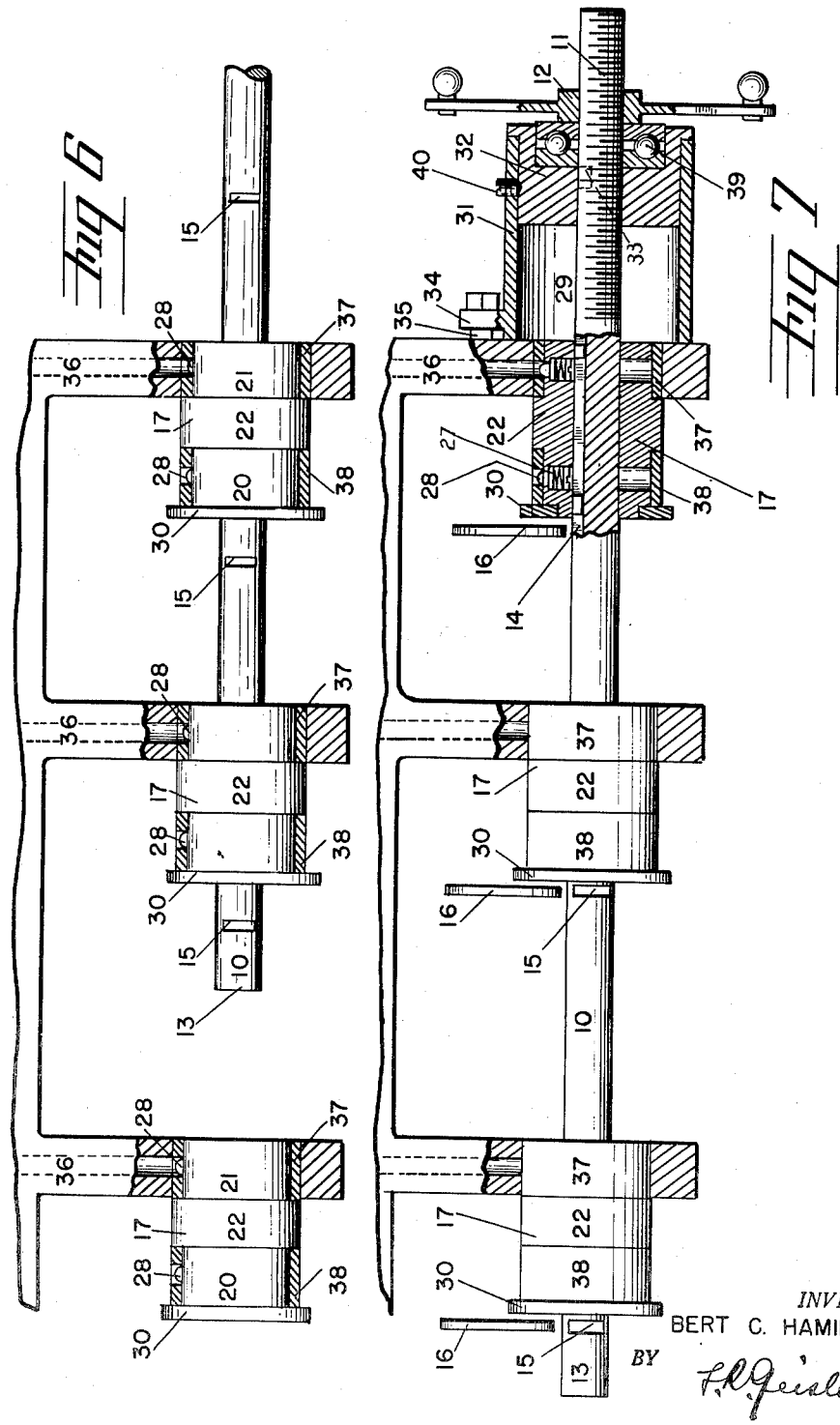
INVENTOR.
BERT C. HAMILTON
BY
ATTORNEY

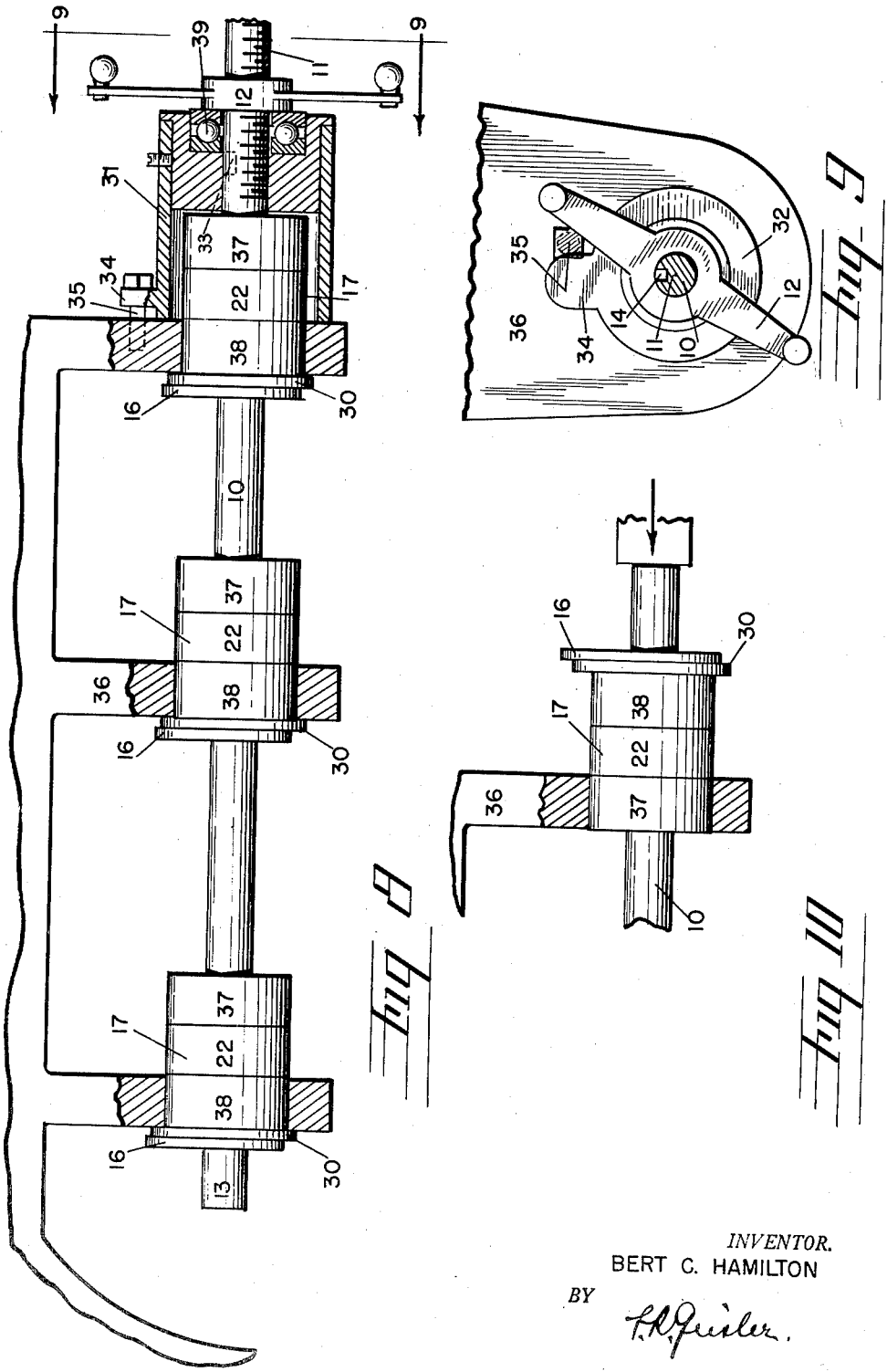

Patented May 13, 1952

2,596,549

UNITED STATES PATENT OFFICE 2,596,549

MULTIPLE BUSHING REPLACER

Bert C. Hamilton, La Grande, Oreg., assignor to Hamilton Tool Co. Inc., La Grande, Oreg., a corporation of Oregon Application January 21, 1950, Serial No. 139,934

3 Claims. (Cl. 29—263)

This invention relates to replacing of tubular or split bushings in a series of similar and related bearings, as, for example, in the bearings for the cam shaft in the engine of an automotive vehicle. Such a shaft requires a number of bearings, depending upon the number of cylinders in the engine, and the replacing of the bushings in such bearings has heretofore presented somewhat of a problem. Not only is the removal of an old bushing and the proper inserting of a new bushing difficult, particularly in the inner bearings which are less accessible, but there is an additional problem in inserting the new bushings in such manner that correct registration of the oil hole of the bushing with the oil hole of the bearing will always result. Frequently considerable time is lost on this latter account alone.

This application is a continuation in part of my pending application Serial No. 20,438, entitled "Means for Removing and Replacing Tubular Bushings," filed April 12, 1948, and also a continuation in part of my pending application, Serial No. 139,043, entitled "Bushing Replacer," filed January 17, 1950, now patented, Patent Number 2,586,222, issued February 19, 1952.

An object of the present invention is to provide improved means whereby the old bushings can be removed from a series of spaced bearings and new bushings inserted in the bearings in a satisfactory manner and in a single operation.

Another object of this invention is to provide improved bushing replacement means with which multiple bushing replacements can be made simultaneously with any possibility of damaging the bearings or the new bushings during such replacement operation practically eliminated.

A further and important object of the invention is to provide a multiple bushing replacer having special means for insuring the bringing of the oil holes of the new bushings into correct registration with the oil holes of the bearings respectively and more or less automatically.

The manner in which these objects are accomplished and the manner in which my improved bushing replacer is constructed and operated will be readily understood from the following brief description with reference to the accompanying drawings, in which:

Fig. 1 is a side elevation of a supporting steel shaft which constitutes the main body member of my multiple bushing replacer, all other members having been entirely removed from this supporting shaft;

Fig. 2 is an exploded view showing, in side elevation, all the other members of the bushing replacer in separated but relative positions and with the supporting steel shaft of Fig. 1 entirely omitted for the sake of clarity;

Fig. 3 is a transverse section of the supporting steel shaft taken on line 3—3 of Fig. 1 but drawn to a larger scale;

Fig. 4 is a face view of one of the split or C-shaped washers in my device, the view being taken on line 4—4 of Fig. 2, but drawn to a larger scale;

Fig. 5 is a transverse section of one of the bushing carriers or cylindrical elements in my device, the section being taken on line 5—5 of Fig. 2, but drawn to a larger scale;

Fig. 6 is a fragmentary sectional elevation of a block having a plurality of spaced bearings with bushings, and illustrates the starting of the setting up of my device in the same;

Fig. 7 is a similar sectional elevation of the same bearing block illustrating a further stage in the setting up of my device in the same;

Fig. 8 is a corresponding sectional elevation illustrating the operation of my device and showing the position of the various members when the new bushings have been inserted in their bearings;

Fig. 9 is an end elevation taken on line 9—9 of Fig. 8; and

Fig. 10 is a fragmentary elevation of a portion of my bushing replacer illustrating a slightly modified manner in which my device may be employed.

In the drawings my bushing replacer is shown as arranged for the replacing of bushings in three spaced bearings. In actual practice, however, my invention will generally be employed for simultaneous replacement of bushings in a larger number of bearings. The arrangement of three bearings as shown has been selected merely for illustration and for the sake of simplicity in describing my invention, and it will be apparent later that my invention can be employed similarly with any number of spaced bearings.

The central or main body member of my bushing replacer consists of a steel shaft 10 (Figs. 1, 6, 7 and 8 of suitable length, depending upon the length of the block in which the bearings are located, and having a diameter considerably less than that of the bearings, the relative size of the shaft and size of the bearing cavities being preferably approximately as shown. A portion 11 at one end of the shaft 10 is threaded and is adapted to have a handled nut 12 (Figs. 2, 7, 8 and 9) screwed thereon. The opposite end of the shaft 10 is indicated by the reference character 13. A longitudinal groove 14 (Figs. 3 and 9) extends the entire length of the shaft 10 and is adapted to accommodate keys on slidable members which are mounted on the shaft, as hereinafter explained, in order to prevent their rotation with respect to the shaft while enabling them to be placed upon and to slide along the entire length of the shaft.

At spaced intervals along the shaft 10, corresponding to the spacings between the bearings in which bushings are to be replaced, pairs of parallel, oppositely positioned, transverse, vertical grooves 15, 15' (Figs. 3 and 1) are formed in the shaft 10. Each of these pairs of grooves 15, 15' is adapted to accommodate and hold a split or C-shaped washer 16 (Fig. 4), the C-shaped washer having a corresponding portion cut out so as to fit into the pair of grooves on the shaft, thus causing such washer when slipped over such portion of the shaft to be securely held against any movement longitudinally on the shaft.

A plurality of identical cylindrical elements, each designated as a whole by the reference character 17, are adapted to be slid on to the shaft 10 from either end. The number of such cylindrical elements employed in my device corresponds to the number of bearings in which the rebushing is to take place. Since these cylindrical elements 17 are identical, it will suffice to describe one of them with reference to Figs. 2, 5, 6 and 7.

Each cylindrical element 17 has an axial cylindrical channel 18 (Fig. 5) of slightly greater diameter than the diameter of the shaft 10 so as to enable the cylindrical element to slide freely longitudinally with respect to the shaft 10. A key 19 (Figs. 2 and 5) extends into the central open channel 18 and is of the proper transverse width to have slidable engagement with the side walls of the longitudinal groove 14 (Fig. 3) of the shaft 10 and thereby prevent any rotation of the cylindrical element 17 with respect to the shaft 10.

Each cylindrical element 17 has a pair of spaced cylindrical sections 20 and 21 (Fig. 2) of the same diameter separated by a cylindrical central shoulder portion 22 of larger diameter. The diameter of the cylindrical sections 20 and 21 is slightly less than the internal diameters of the bushings in the bearings while the diameter of the shoulder portion 22 is slightly less than the external diameter of the bushings and thus slightly less than the diameter of the bearings for the bushings. The cylindrical section 20 terminates at its outer end in a short reduced diameter portion 23 (Fig. 2).

A transverse channel 24 (Figs. 2 and 5) extends diametrically through each cylindrical section 20 and 21 of the cylindrical element 17. These two transverse channels 24 are identical and the axes of both of these transverse channels extend in the same plane passing through the longitudinal center axis of the cylindrical element 17. The transverse channel 24 in section 21 is spaced a predetermined distance from the enlarged shoulder portion 22 of the element, and the corresponding transverse channel 24 in section 20 is spaced the same distance from the reduced diameter portion 23. The diameter of each transverse channel 24 is reduced near an outer end so as to produce an internal annular shoulder 25 (Fig. 5). The inner end of this same portion of the channel 24 is threaded to accommodate a threaded plug 26. A stud 27, having a rounded outer knob-like extension 28 is slidably mounted in the channel 24 and is normally held in outermost position pressed against the shoulder 25 by a coil spring 29, the inner end of which coil spring bears against the plug 26. Thus the rounded outer end of the knob 28 extends slightly out beyond the cylindrical surface of the section but can be pressed inwardly against the force of the spring 29.

Each cylindrical element 17 is designed to perform a double function, namely to remove an old bushing from a bearing and to insert a new bushing in the bearing. When my device is employed in the manner illustrated in Figs. 6, 7 and 8 the new bushing is mounted on section 20 of the cylindrical element 17 and section 21 of the element is adapted to be inserted in the old bushing. The spring controlled knob 28 in section 21 engages the oil hole of the old bushing, and the new bushing, when it is slid on to section 20, is positioned so that its oil hole is brought into engagement with the knob 28 on that section 20. In this way the oil hole of the new bushing is caused to be brought into perfect alignment with the oil hole of the old bushing. Further reference will be made to this later. A washer 30 (Figs. 2, 6 and 7) is adapted to be placed on the reduced diameter end 23 of the element 17 after the new bushing has been slid on to the section 20 of the element.

A final member of my multiple bushing replacer consists of a cap 31 (Figs. 2, 7, 8 and 9). This cap 31 has a cylindrical wall, the internal diameter of which is greater than the diameter of the bearings in which the bushing replacement takes place, and the cap has a head portion 32 with a central channel of proper diameter to enable the cap to have sliding engagement with respect to the shaft 10. This central channel through the head 32 of the cap 31 is formed with a key 33 for engaging the longitudinal groove 14 of the shaft 10 (see Figs. 7 and 8) so as to prevent any rotation of the cap 31 and the shaft 10 with respect to each other, while permitting the shaft to be moved longitudinally with respect to the cap. The cylindrical wall of the cap 31 is formed with an offset 34 near its open end and this offset 34 is adapted to engage the head of a screw 35 on the outer face of the bearing block 36 so as to hold the cap 31 against rotation when it is set against the outer face of the bearing block, in the position shown in Figs. 7 and 8. A recess is formed in the outer face of the head 32 of the cap 31 to accommodate a set of ball bearings 39 and the customary pair of races.

The manner in which my device is employed will now be briefly explained with reference to Figs. 6, 7 and 8, it being assumed for the purpose of illustration that the bearing block 36 has three bearings and that my device has been arranged specifically for use with this three-bearing set up. The old bushing in each of the three bearings is indicated by the reference character 37. The new bushing for each bearing is correspondingly indicated by the reference character 38. Since there are three bearings in which bushings are to be replaced, my device in this case will include three of the cylindrical elements 17. A new bushing 38 is first slid into place on section 20 of each cylindrical element 17, the oil hole of the new bushing 38 being brought into engagement with the positioning knob 28 on section 20 of the cylindrical element 17. The section 21 of each cylindrical element 17 is inserted in an old bushing 37 and the positioning knob 28 of section 21 is brought into engagement with the oil hole of the old bushing. A washer 30 is then placed on the end of the cylindrical element 17 in contact with the outer end of the new bushing 38. The shaft 10 is inserted in the bearing block 36, being passed successively through the three bearings and at the same time through the three cylindrical elements 17, the shaft being inserted from right to left as viewed in Fig. 6. Since the sections 21 of the cylindrical elements 17 are set in the old bushings 37 with the positioning knobs 28 engaging the oil hole of the old bushings 37, and since each cylindrical element has a key for engaging the longitudinal groove 14 in the shaft 10, the shaft 10 is not turned while being inserted through the cylindrical elements and bearings. The C-shaped washers 16 are next placed on the shaft 10 behind each cylindrical element 17, so as to limit the longitudinal movement of the shaft 10 in the reverse direction (from left to right) through the elements 17. Finally the cap 31 is set in place on the right hand end portion 11 of the shaft 10 and is brought into position against the outer face of the block 36. During this positioning of the cap 31 the cap, because of its key connection with the shaft 10, is not rotated and when the cap 31 is set against the outer face of the block 36 a screw 35 is inserted through the offset 34 of the cap so as to engage an aperture in the face of the block 36 to prevent any rotating of the cap 31 with respect to the block. Now the nut 12 is screwed on the threaded end 11 of the shaft 10, and continued rotation of this nut, after engaging the outer end of the cap 31, will pull the shaft 10, and with it the cylindrical elements 17, to the right from the position in Fig. 7 to that shown in Fig. 8. The ball bearings 39 in the cap head 32 facilitate the turning of the nut 12 without the turning of the cap. As each element 17 is forced to the right in one of the bearings the old bushing 37 is forced out of the bearing and the new bushing 38 is inserted in its place. Not only will the new bushings be inserted in the bearings by the same operation performed for pulling out the old bushings, but since the oil holes of the new bushings are kept absolutely aligned with the oil holes of the old bushings, the possibility of having the new bushings forced into place with their oil holes out of registration with the bearing oil holes is practically eliminated.

While the reduced diameter end 23 on each cylindrical element 17 and the corresponding washer 30 could be omitted, the outer end of the new bushing 38 would then bear directly against the C-shaped washer 16. To prevent the possibility of the new bushing receiving an unevenly distributed thrust from such C-shaped washer I have found it preferable to have the intermediate ring washer 30 interposed between the bushing and the C-shaped washer in the manner described to insure an evenly distributed end thrust on the new bushing as it is inserted forcibly in the bearing.

When oil holes are not provided in the bearings and bushings the cylindrical elements 17 in my device could, of course, be made without the transverse channels 24, and also the shaft 10 could be made without the longitudinal groove 14 and the keys which fit into the groove 14 would then be omitted. However, in most bearings of the type indicated, oil holes are provided.

The cap 31 and the shaft-pulling nut 12 can be omitted from my device if desired and the necessary pulling force can be exerted by other means if desired. However, I have found that the use of the cap 31 with the pulling nut 12 is generally to be preferred and the use of these two members with my device requires very little extra time. In fact the entire operation of replacing the multiple bushings need require only a few minutes and with no particular skill required by the operator.

Although I have illustrated and described my device as employed for the replacement of bushings simultaneously in three separate bearings in a block, it will be apparent that my device will work just as satisfactorily in the case of a larger number of spaced bearings. All that is required is to have a sufficient number of the cylindrical elements 17 and the shaft 10 made of sufficient length with pairs of vertical slots and with the C-shaped washers positioned at the proper intervals.

Instead of employing my bushing replacer exactly in the manner which I have described, in which a pulling thrust is required to pull the old bushings out of the bearings and pull the new bushings into the bearings, the arrangement of the cylindrical elements 17 on the main shaft 10 can be reversed. In other words, each cylindrical element 17 will be placed on the shaft 10 with the reduced diameter portion 23, on which the washer 30 is mounted, to the right instead of to the left. In such reversed arrangement, as illustrated in Fig. 10, the new bushing 38 is on the right end of the element 17, the C-shaped washer 16 is placed to the right of each element 17, each element 17 is inserted in an old bushing from the right instead of from the left, and a thrusting force, exerted from right to left, is then used to push out the old bushings and push in the new bushings, the thrusting force being thus exerted in the direction indicated by the arrow in Fig. 10. This thrusting force could be furnished by hammer blows against the right hand end of the shaft 10, but much more preferably by a press, jack, or any other equally suitable means so set up as to exert the required thrusting force.

I claim:

1. In a bushing replacer of the character described, a shaft of considerably smaller diameter than the interior diameter of the bushing to be replaced, a cylindrical bushing-engaging element slidable on said shaft, said element having end sections with a diameter approximately equal to the internal diameter of a bushing and a cylindrical shoulder separating said end sections, the diameter of said shoulder being approximately equal to the external diameter of a bushing to enable said shoulder to engage a bushing to be removed, a pair of oil hole guides in said end sections respectively of said element positioned in longitudinal alignment with each other, a longitudinal groove on said shaft, said element having a key extending into said groove to prevent rotation of said element on said shaft, a removable engaging member mountable in fixed position on said shaft for engagement with one end of said element, means on said shaft for holding said member against longitudinal movement on said shaft, whereby the engagement of said member with one end of said element will cause said element to be moved longitudinally with the longitudinal movement of said shaft, a removable washer at the engaged end of said element in contact with said member, said washer having a considerably larger outside diameter than the external diameter of a bushing, said washer acting to hold a replacement bushing on said element and to limit the movement of said element and replacement bushing with respect to the bearing, means for producing longitudinal movement of said shaft and therewith of said element and means associated with the outer end of said shaft to prevent the rotation of said shaft during forcible longitudinal movement of said shaft.

2. A multiple bushing replacer of the character described including a shaft of sufficient length to extend through all the bushings to be replaced, a plurality of cylindrical bushing-engagement elements slidable on said shaft, each of said elements having end sections with a diameter approximately equal to the internal diameter of a bushing and a cylindrical shoulder separating said end sections, the diameter of said shoulder being approximately equal to the external diameter of a bushing to enable said shoulder to engage a bushing to be removed, a pair of oil hole guides in said end sections respectively of each of said elements positioned in longitudinal alignment with each other, a longitudinal groove on said shaft, each of said elements having a key extending into said groove to prevent rotation of said elements on said shaft, removable engaging members mountable in fixed position at spaced distances along said shaft for engagement with one end of each of said elements respectively, means on said shaft for holding said members against longitudinal movement on said shaft, whereby the engagement of said members with one end of each of said elements respectively will cause said elements to be moved longitudinally with the longitudinal movement of said shaft, a removable washer at the engaged end of each of said elements in contact with the respective engaging member, said washers having a considerably larger outside diameter than the external diameter of a bushing, said washers acting to hold a replacement bushing on each of said elements respectively and to limit the movement of said elements and replacement bushings with respect to the bearings, means for producing longitudinal movement of said shaft and therewith of said elements and means associated with the outer end of said shaft to prevent the rotation of said shaft during forcible longitudinal movement of said shaft.

3. A multiple bushing replacer comprising a shaft of considerably smaller diameter than the interior diameter of the bushings to be replaced and of sufficient length to extend through all the bushings to be replaced, a plurality of cylindrical bushing-engaging elements slidable on said shaft, each of said elements having end sections with a diameter approximately equal to the internal diameter of a bushing and a cylindrical shoulder separating said end sections, the diameter of said shoulder being approximately equal to the external diameter of a bushing to enable said shoulder to engage a bushing to be removed, a pair of oil hole guides in said end sections respectively of each of said elements positioned in longitudinal alignment with each other, each of said guides consisting of a knob movable radially in the element and having an outer rounded end of the same maximum diameter as a bushing oil hole, spring means normally causing said knob end to extend a slight distance out on the surface of the element but permitting said knob to be easily pushed inwardly in the element, a longitudinal groove on said shaft, each of said elements having a key extending into said groove to prevent rotation of said elements on said shaft, removable engaging members mountable in fixed position at spaced distances along said shaft for engagement with one end of each of said elements respectively, means on said shaft for holding said members against longitudinal movement on said shaft, whereby the engagement of said members with one end of each of said elements respectively will cause said elements to be moved longitudinally with the longitudinal movement of said shaft, a removable washer on the engaged end of each of said elements in contact with the respective engaging member, said washers having a considerably larger outside diameter than the external diameter of a bushing, said washers acting to hold a replacement bushing on each of said elements respectively and to limit the movement of said elements and replacement bushings with respect to the bearings, means for producing longitudinal movement of said shaft and therewith of said elements and means associated with the outer end of said shaft to prevent the rotation of said shaft during forcible longitudinal movement of said shaft.

BERT C. HAMILTON.

REFERENCES CITED

The following references are of record in the file of this patent:

UNITED STATES PATENTS

| Number | Name | Date |
|---|---|---|
| 389,335 | Spear | Sept. 11, 1888 |
| 1,422,067 | Abegg | July 11, 1922 |
| 1,533,619 | Thompson | Apr. 14, 1925 |
| 1,736,529 | Goeller | Nov. 19, 1929 |
| 1,760,989 | Lewis | June 3, 1930 |
| 1,834,918 | Altvater | Dec. 8, 1931 |
| 1,927,844 | Pfauser | Sept. 26, 1933 |
| 1,955,728 | Allen | Apr. 24, 1934 |
| 1,972,455 | Miller | Sept. 4, 1934 |
| 1,987,677 | Glassford | Jan. 15, 1935 |
| 2,317,405 | Rutten | Apr. 27, 1943 |
| 2,430,733 | Paxson | Nov. 11, 1947 |
| 2,497,498 | Hamilton | Feb. 14, 1950 |